(12) United States Patent
Wang et al.

(10) Patent No.: US 9,003,018 B2
(45) Date of Patent: Apr. 7, 2015

(54) SYSTEM AND METHOD FOR DATA SET SYNCHRONIZATION AND REPLICATION

(75) Inventors: Xiaopin (Hector) Wang, Beijing (CN); Shisheng (Victor) Liu, Beijing (CN); Guoxian Shang, Beijing (CN); Haiyang Zhang, Beijing (CN)

(73) Assignee: CA, Inc., New York, NY (US)

( * ) Notice: Subject to any disclaimer, the term of this patent is extended or adjusted under 35 U.S.C. 154(b) by 458 days.

(21) Appl. No.: 13/233,796

(22) Filed: Sep. 15, 2011

(65) Prior Publication Data

US 2013/0073714 A1 Mar. 21, 2013

(51) Int. Cl.
*G06F 15/173* (2006.01)
*G06F 17/30* (2006.01)
*G06F 11/20* (2006.01)

(52) U.S. Cl.
CPC ...... *G06F 17/30578* (2013.01); *G06F 11/2094* (2013.01); *G06F 11/2097* (2013.01)

(58) Field of Classification Search
CPC ............ G06F 11/2097; G06F 11/2094; G06F 17/30578
USPC ............................ 709/223–224, 231; 707/223
See application file for complete search history.

(56) References Cited

U.S. PATENT DOCUMENTS

| | | | |
|---|---|---|---|
| 5,832,225 A * | 11/1998 | Hacherl et al. | 709/223 |
| 5,926,816 A | 7/1999 | Bauer et al. | |
| 6,330,717 B1 * | 12/2001 | Raverdy et al. | 717/170 |
| 6,606,643 B1 * | 8/2003 | Emens et al. | 709/203 |
| 6,694,337 B1 | 2/2004 | King et al. | |
| 6,889,333 B2 * | 5/2005 | Lawrence et al. | 713/400 |
| 7,321,904 B2 | 1/2008 | Holenstein et al. | |
| 7,463,599 B2 * | 12/2008 | Lindoff et al. | 370/311 |
| 7,801,966 B2 * | 9/2010 | Dionne et al. | 709/217 |
| 7,853,561 B2 | 12/2010 | Holenstein et al. | |
| 7,882,062 B2 | 2/2011 | Holenstein et al. | |
| 8,001,080 B2 * | 8/2011 | Gupta et al. | 707/617 |
| 8,549,347 B1 * | 10/2013 | Brandwine et al. | 714/4.11 |
| 8,769,336 B1 * | 7/2014 | Natanzon et al. | 714/6.23 |
| 2002/0176448 A1 * | 11/2002 | Sikdar | 370/503 |
| 2004/0199498 A1 * | 10/2004 | Kapur et al. | 707/3 |
| 2005/0154791 A1 * | 7/2005 | Sutou | 709/223 |
| 2005/0203971 A1 * | 9/2005 | Koskimies et al. | 707/203 |
| 2007/0038642 A1 * | 2/2007 | Durgin et al. | 707/10 |
| 2007/0208783 A1 * | 9/2007 | Midgley et al. | 707/201 |
| 2007/0271309 A1 * | 11/2007 | Witriol et al. | 707/201 |
| 2008/0065648 A1 * | 3/2008 | Gupta et al. | 707/10 |
| 2009/0037430 A1 * | 2/2009 | Mukkamala et al. | 707/10 |
| 2009/0327859 A1 * | 12/2009 | Kadluczka et al. | 715/234 |
| 2010/0179940 A1 * | 7/2010 | Gilder et al. | 707/622 |
| 2011/0010341 A1 * | 1/2011 | Chen et al. | 707/637 |
| 2011/0040792 A1 * | 2/2011 | Perry | 707/783 |
| 2011/0087802 A1 * | 4/2011 | Witriol et al. | 709/248 |
| 2011/0196830 A1 * | 8/2011 | Zunger et al. | 707/624 |
| 2011/0239037 A1 * | 9/2011 | Peng et al. | 714/3 |
| 2013/0151469 A1 * | 6/2013 | Baker et al. | 707/621 |
| 2013/0226867 A1 * | 8/2013 | Lee et al. | 707/610 |

* cited by examiner

*Primary Examiner* — Anthony Mejia
(74) *Attorney, Agent, or Firm* — Baker Botts L.L.P.

(57) ABSTRACT

According to one embodiment of the present disclosure, a method for synchronizing data sets includes receiving a request to synchronize a first data set associated with a first server and a second data set associated with a second server. The method also includes determining, with reference to one or more replication constraints, whether to begin synchronization. The method further includes applying one or more resource control actions in response to determining to begin synchronization.

19 Claims, 3 Drawing Sheets

SYSTEM AND METHOD FOR DATA SET SYNCHRONIZATION AND REPLICATION

TECHNICAL FIELD

The present disclosure relates generally to data set synchronization and replication and more particularly to a system and method for the synchronization of data sets with reference to one or more replication constraints.

BACKGROUND

Synchronization may refer to the process of making the data contained in a first data set identical with the data contained in a second data set. Replication may refer to the process of maintaining identical copies of data on the first data set and the second data set. During data set synchronizations, file input/output journals accumulated in spools may become very large, causing the spools to overfill. In addition, data set synchronizations may greatly reduce the performance of a protected application such that users may wish to slow down or stop the synchronization and/or replication process during certain hours of the day to avoid degradation of an application's performance. However, slowing the synchronization may cause the spool to overfill during the synchronization process.

SUMMARY

According to one embodiment of the present disclosure, a method for synchronizing and replicating data sets includes receiving a request to synchronize a first data set associated with a first server and a second data set associated with a second server. The method also includes determining, with reference to one or more replication constraints, whether to begin synchronization. The method further includes applying one or more resource control actions in response to determining to begin synchronization.

In some embodiments of the present disclosure, the method may include determining compliance with one or more replication constraints, and determining a synchronization speed based in response to non-compliance with the one or more replication constraints. Further embodiments may include determining compliance with one or more replication constraints by determining a system utilization metric of the first server, and comparing the system utilization metric of the first server to the one or more replication constraints.

In particular embodiments of the present disclosure, the method may include generating one or more low content replication journal entries comprising a set of instructions indicating write events at one or more data ranges. In other embodiments, the method may include consolidating the one or more low content replication journals by receiving a first set of instructions indicating write events at one or more data ranges, receiving a second set of instructions indicating write events at one or more data ranges, identifying one or more redundancies between the first and second sets of instructions, and generating a third set of instructions comprising the instructions of the first and second sets of instructions without the one or more redundancies.

In further embodiments of the present disclosure, the method may include retrieving data from the one or more data ranges, and generating one or more full content replication journal entries comprising the one or more low content journal entries and the retrieved data. In some embodiments, the method may include sending one or more of the one or more full content replication journal entries to the second server for replication, and recording which of the one or more full content replication journal entries have been sent to the second server for replication.

Technical advantages of the present disclosure include a system and method that allow for the synchronization and replication of data sets according to one or more replication constraints. Particular embodiments of the present disclosure may allow for replication constraints based on the time of day. For example, a user may wish to set a very low synchronization speed or entirely prohibit synchronization during business hours in order to avoid performance deterioration of the first server. Other embodiments of the present disclosure may allow for replication constraints based on a system utilization metric of the first server such as processor utilization, memory utilization, or network bandwidth. For example, the user may wish to only allow the processes related to synchronization to use a certain portion of available system resources based on the system utilization metric.

Other technical advantages of the present disclosure include generating low content replication journal entries comprising a set of instructions indicating write events at one or more data ranges, which may allow for lower memory utilization and thus a lower possibility of the spool overfilling. For example, low content journal entries produced during the synchronization of a large data set may have a lower likelihood of causing the spool to overfill since they do not include the data to be written to the data ranges. Particular embodiments of the present disclosure may also allow for consolidating the one or more low content replication journals, which may lead to further lowered memory utilization and possibility of the spool overfilling.

Other technical advantages of the present disclosure include recording which of the one or more full content journal entries have been sent to the second server for replication, which may prevent the synchronization process from having to start over. For example, if the synchronization and/or replication process is delayed (for example, because of non-compliance with a replication constraint), the data sets would not be required to restart the synchronization process before continuing replication.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF EXAMPLE EMBODIMENTS

Embodiments of the present disclosure and its advantages are best understood by referring to FIGS. 1 through 5 of the drawings, like numerals being used for like and corresponding parts of the various drawings.

Figure 1:
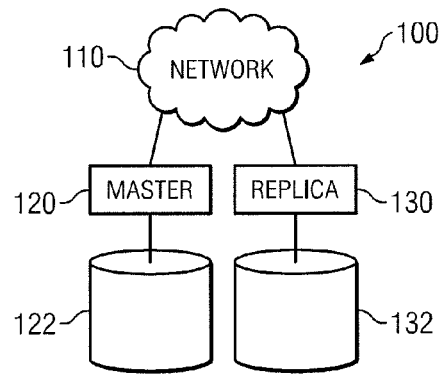
FIG. 1 illustrates a system that includes an network, a master server, and a replica server.

FIG. 1 illustrates a system 100 that includes a network 110, a master server 120, and a replica server 130, and may embody aspects of the present disclosure. In particular embodiments, network 110 may be used to synchronize and/or replicate data from a data set 122 associated with master server 120 to a data set 132 associated with replica server 130. Synchronization may refer to the process of making the data contained in data set 122 identical with the data contained in data set 132. Replication may refer to the process of maintaining identical copies of data on data set 122 and data set 132, where data set 122 and data set 132 have been previously synchronized. Replication may be performed by capturing byte-level changes in the data on data set 122 at master server 120, and asynchronously transmitting the changes to replica server 130 so that the changes may be replicated or reproduced at data set 132. In particular embodiments, such changes may be stored at master server 120 until synchronization is complete and then sent to replica server 130. Once received at replica server 130, the changes are recreated at data set 132 in order to maintain identical copies of data at data sets 122 and 132. According to the present invention, the synchronization and replication of data set 122 and data set 132 may be accomplished with reference to one or more replication constraints and/or through the application of one or more resource control mechanisms or actions. Replication constraints may refer to one or more rules set by a user of system 100 that govern the speed at which system 100 performs synchronization of data set 122 and data set 132. In contrast, resource control actions may refer to the actions which master server 120 may take in order to reduce the amount of system resources utilized during the synchronization and replication process.

System 100 includes network 110, which may refer to any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise internet, or any other suitable communication link, including combinations thereof. System 100 may also include a master server 120. Master server 120 may be used to process and/or store data communications to or from network 110 or system 100. In particular embodiments, master server 120 may be associated with a master data set 122 that is maintained at master server 120. System 100 may also include a replica server 130, that may be used to process and/or store data communicated to or from network 110 or system 100. In particular embodiments, replica server 130 may be associated with a replica data set 132. Replica data set 132 may be data that is replicated from and/or synchronized with master data set 122.

Figure 2A:
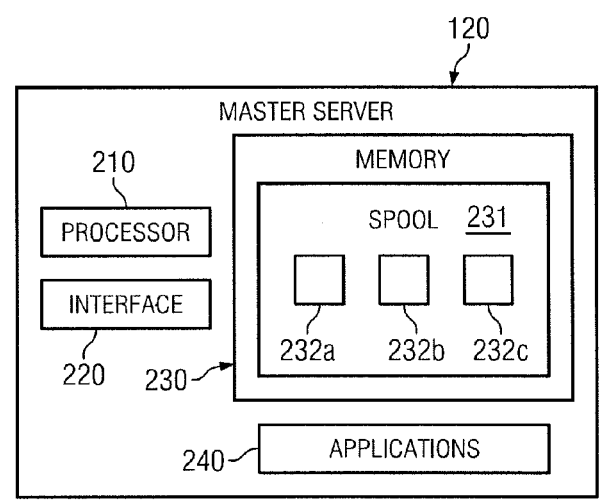
FIG. 2A illustrates an example of a master server running on a computer network.

FIG. 2A illustrates an example of master server 120. Master server 120 includes a processor 210, an interface 220, memory 230, and one or more applications 240. Processor 210 may refer to any suitable device operable to execute instructions and manipulate data to perform operations for master server 120. Processor 210 may include, for example, any type of central processing unit (CPU).

Interface 220 may refer to any suitable device operable to receive input for master server 120, send output from master server 120, perform suitable processing of the input or output or both, communicate to other devices, or any combination of the preceding. Interface 220 may include appropriate hardware (e.g. modem, network interface card, etc.) and software, including protocol conversion and data processing capabilities, to communicate through a LAN, WAN, or other communication system that allows master server 120 to communicate to other devices. Interface 220 may include one or more ports, conversion software, or both.

Memory 230 stores information. Memory 230 may comprise one or more tangible, computer-readable, and/or computer-executable computer readable medium, and may exclude signals or carrier waves. Examples of memory include computer memory (for example, Random Access Memory (RAM) or Read Only Memory (ROM)), mass computer readable media (for example, a hard disk), removable computer readable media (for example, a Compact Disk (CD) or a Digital Video Disk (DVD)), database and/or network storage (for example, a server), and/or other computer-readable medium.

Spool 231 refers to a portion of memory 230 wherein one or more replication journals may be temporarily stored prior to being sent to replica server 130 for replication. During synchronization, master server 120 records all I/O operations that occur at data set 122 and stores them in replication journals as one or more instructions for replication. In particular embodiments, the replication journals 232 may be stored in spool 231 until synchronization is complete, at which point they are sent to replica server 130. Replica server 130 may then and perform the one or more instructions for replication by replaying the I/O operations that previously occurred at data set 122 on the files at data set 132. Thus, it will be understood that spool 231 acts as a queue for the instructions for replication located in replication journals 232. In some embodiments, replication may be performed through an online replication process, wherein the replication journals are sent to replica server 130 as soon as master server 120 is ready to send them to replica server 130. In other embodiments, replication may be performed through a periodic replication process, wherein the replication journals are only sent to replica server 130 at certain fixed times.

Applications 240 refer to logic that may be encoded in one or more tangible media and may perform operations when executed by processor 210. For example, master server 120 may run applications such as MICROSOFT® Exchange, MICROSOFT® Sharepoint, or MICROSOFT® Dynamics CRM. In accordance with the present invention, one or more applications 240 on master server 120 and the data associated with said applications stored at data set 122 may be synchronized and replicated at replica server 130 and data set 132, respectively.

Figure 2B:
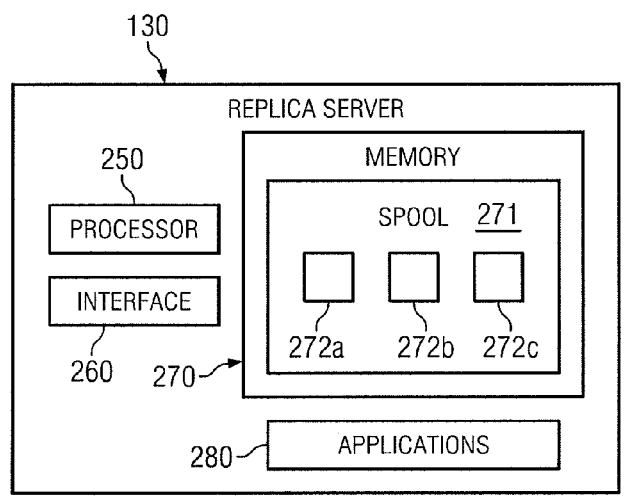
FIG. 2B illustrates an example of a replica server running on a computer network.

FIG. 2B illustrates an example of replica server 130. It will be appreciated by one skilled in the art that replica server 130 comprises substantially similar components to those listed above for master server 120, as replica server 130 provides a redundant version of master server 120 for failover situations where master server 120 is not available for one or more reasons. Thus, Replica server includes a processor 250, an interface 260, memory 270, and one or more applications 280. In addition, replica server 130 includes a spool 271 located in memory 270, which may store the replication journals 272 while they are queued for replication at data set 132.

Once received from master server 120, replica server 130 stores and queues replication journals 272 until it is ready to read the instructions in the journals and then perform those instructions at data set 132, writing specified data to the particular data ranges of data set 132 indicated in the instructions.

A number of issues exist in the synchronization and replication of data sets. For instance, the synchronization of large data sets may lead to extremely large replication journals being stored in spool 231. During synchronization, replication journals 232 may be stored in spool 231 until synchronization is complete, at which point they are sent to replica server 130 for replication. Because large data sets require a greater amount of time to synchronize than smaller data sets, replication journal sizes increase for larger data sets. Therefore, it is possible that the size of replication journals 232 required to be stored in spool 231 during the synchronization of large data set may exceed the capacity of spool 231.

In addition, the synchronization and replication of data sets may require a significant amount of system resources at master server 120 and replica server 130. As a result, the performance of applications on master server 120 may suffer while synchronization and replication occurs. Accordingly, one may desire to slow down and/or restrict synchronization and replication during particular times of day, for instance, during business hours or any other time of day at which the application will utilize more resources. However, slowing and/or restricting synchronization and replication leads to larger replication journals 232 being stored in spool 231 due to the increased amount of time necessary to complete synchronization. Thus, it is possible that the size of replication journals 232 required to be stored in spool 231 during a slowed or restricted synchronization may exceed the capacity of spool 231. It is therefore an object of the present invention to overcome such issues in the art.

Figures 3A, 3B:
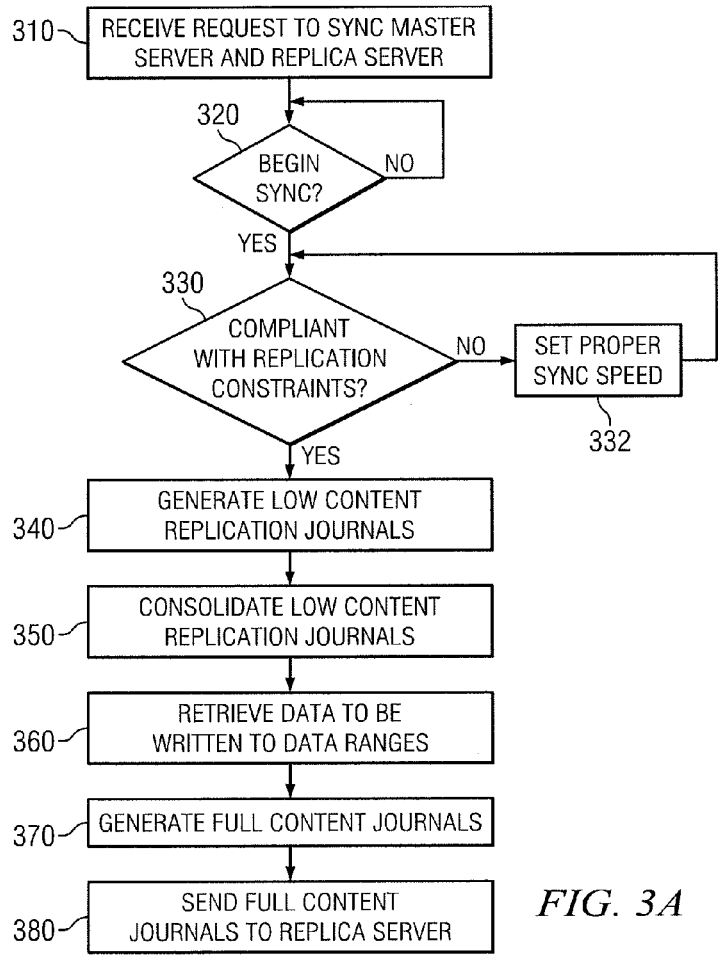
FIG. 3A illustrates an example method for synchronizing and replicating data sets.
FIG. 3B illustrates examples of write events in data ranges.

FIG. 3A illustrates an example method 300 for synchronizing and replicating data sets according to the present invention. The method begins at step 310, where master server 120 receives a request to synchronize data set 122 associated with master server 120, and data set 132 associated with replica server 130. In particular embodiments, this request may be received at interface 220 of master server 120. Once the request is received, the method proceeds to step 320.

At step 320, master server 120 determines whether to begin synchronization of data sets 122 and 132. This determination may be made based on any number of replication constraints. For example, the user may wish to prohibit synchronization during certain times of day in which internal or external network or system resources may be in high demand or otherwise have relatively limited availability. If it is determined at step 320 to not begin synchronization, master server 120 continues to determine whether it should begin the synchronization process until it is determined that it should begin synchronization. If it is instead determined that the synchronization process should begin, master server 120 begins synchronization and applies one or more resource control actions to the synchronization and replication process. The one or more resource control actions may include one or all of the following as explained further below: setting a synchronization speed based on a system utilization metric, postponing synchronization during certain times of day, switching to a periodic replication process and generating low content replication journal entries, and/or consolidating the low content replication journal entries.

At step 330, master server 120 determines whether it is compliant with one or more replication constraints. In particular embodiments, a user may wish to set a replication constraint based on the time of day. For example, the user may wish to entirely discontinue synchronization during business hours or other days and/or times when internal or external network or system resources may be in high demand or otherwise have relatively limited availability. In other embodiments, a user may wish to set a replication constraint based on a system utilization metric related to the performance of one or more applications 240 on master server 120. In such embodiments, the user may wish to adjust synchronization speed based on one or more system utilization metrics such as processor utilization, memory utilization, or network bandwidth. For example, the user may wish to only allow the processes related to synchronization to use a certain portion of available system resources determined from the one or more system utilization metrics. In further embodiments, a user may wish to set replication constraints based on both time of day and performance of application 240.

If it is determined at step 330 that system 100 is not compliant with the one or more replication constraints, the method continues to step 332 where master server 120 determines and sets an appropriate synchronization speed in order to comply with the one or more replication constraints. In particular embodiments, master server 120 may set the synchronization speed based on the comparison of a system utilization metric and one or more of the replication constraints. For example, if an application 240 requires a large amount of system resources on master server 120, the synchronization speed may be lowered in order to prevent the deterioration of the performance of application 240. In other embodiments, master server 120 may adjust the synchronization speed, or even prohibit synchronization, for specified periods of time. For example, a user may wish to set a very low synchronization speed or entirely prohibit synchronization during business hours in order to avoid performance deterioration of application 240 on master server 120. Although step 320 is shown in FIG. 3A as taking place at this point in the example method, it will be understood by those skilled in the art that this step may be performed at any point in the synchronization and replication process, or at multiple points during the process. In addition, it will be understood that this step may be performed continually during the synchronization and replication process in order to ensure optimal synchronization and replication conditions throughout.

If it is instead determined at step 320 that system 100 is in compliance with the one or more replication constraints, the method continues to step 340. At step 340, master server 120 switches to a periodic replication process and generates one or more low content replication journals comprising instructions indicating the data ranges where write events have occurred. This is in contrast to full content replication journal entries which include both instructions indicating data ranges where write events have occurred and the data of the write events. For purposes of illustration of these concepts, reference to FIG. 3B will now be made. FIG. 3B illustrates examples write events in data blocks 1 to 4. Event 341 shows write events A, B, and C being written to data blocks 1, 2, and 3, respectively at time t=1. Similarly, event 342 shows write events D, E, and F being written to data blocks 2, 3, and 4, respectively at time t=2. A full content replication journal entry for event 341 would thus include both instructions indicating a write event at data range 1-3, as well as data A, B, and C. In contrast, a low content replication journal entry for event 341 would only include the instructions indicating the write event at data range 1-3. In the latter example, the system is only recording the fact that a write event occurred at data range 1-3 at time t=1, but is not recording the data (i.e. A, B, C) itself.

At step 350, master server 120 may make use of a journal consolidation algorithm to consolidate the one or more low content replication journal entries, removing any redundancies between the different replication journal entries. This may include receiving first and second sets of instructions indicating write events at one or more data ranges, identifying one or more redundant write events between the first and second sets of instructions, and generating a third set of instructions comprising the instructions of the first and second sets of instructions without the one or more redundancies. Referring to FIG. 3B, this may include receiving the instructions indicating a write event at data range 1-3 at t=1 and the instructions indicating a write event at data range 2-4 at t=2, identifying the redundant write events at data range 2-3, and then generating a third set of instructions indicating a single write event to data range 1-4. Thus, the low content journal will include instructions indicating a single write event at data range 1-4 instead of two separate write events at data range 1-3 and data range 2-4, thereby conserving memory in the spool.

At step 360, master server 120 retrieves the data in data set 122 to be written to the data ranges indicated in the one or more low content replication journal entries. This may be accomplished by copying the data in the data ranges indicated in the low content replication journal entries. For example, the Volume Shadow Copy Service in MICROSOFT® Windows may be utilized to create Volume Shadow Service (VSS) snapshots of the data located in the indicated data ranges. Referring to FIG. 3B, this includes retrieving data A, D, E, and F from data range 1-4. At step 370, master server 120 generates full content replication journal entries comprising the instructions from the low content replication journal entries indicating write events at one or more data ranges and the retrieved data. At step 380, master server 120 sends one or more of the full content replication journal entries to replica server 130 for replication.

Due to the amount of system resources required to retrieve data in step 360, steps 360, 370, and 380 may take an extended amount of time to complete. Therefore, it is possible that steps 360, 370, and 380 may not fully come to completion before synchronization is stopped due to one or more replication constraints. In prior systems, if the synchronization process were stopped for some reason without completion, the entire synchronization and replication processes would need to be restarted. In some situations, this may require master server 120 to compare data sets 122 and 132 to determine differences in the data contained therein, which may consume a large amount of time and/or system resources. However, according to the present disclosure, master server 120 may keep track of the progress of the synchronization and replication processes in order to avoid restarting the processes. For example, master server 120 may record which of the generated full content replication journal entries have been sent to replica server 130 for replication, avoiding the need for master server 120 to compare data sets 122 and 132. Thus, the synchronization and replication processes may resume from their previous state, and only the unsent full content replication journal entries need to be sent to replica server 130 for replication.

Figure 4:
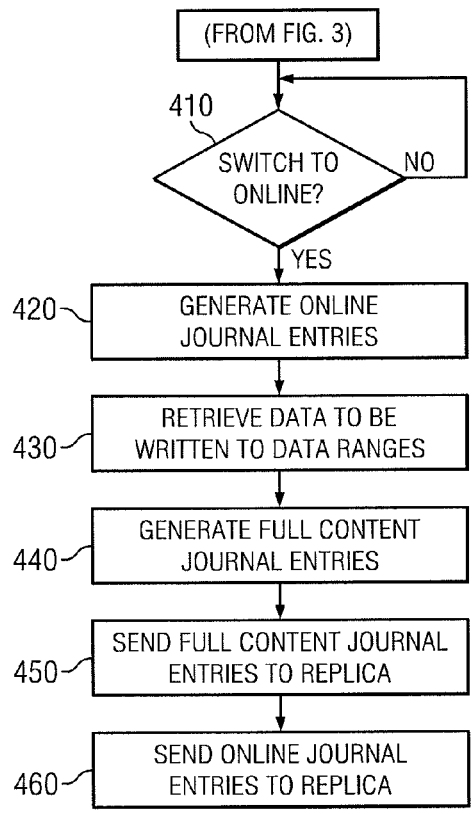
FIG. 4 illustrates an example method for switching to an online replication process.

FIG. 4 illustrates an example method for switching to an online replication process. The method begins at step 410, where master server 120 determines whether to switch to an online replication process from a periodic replication process. In particular embodiments, master server 120 may determine whether to switch to an online process based on the amount of data that needs to be sent to replica server 130. For example, master server 120 may determine the amount of data that needs to be sent by determining the number of data ranges at which write events have occurred. Master server 120 may then use this information coupled with the amount of traffic on the network to determine whether it should switch to an online replication process. In further embodiments, master server 120 may also use the replication constraints to determine whether to switch to an online replication process. If master server 120 determines not to switch to an online replication process, it will periodically check again to determine whether switching to an online replication process is appropriate. However, if master server 120 determines to switch to an online replication process, the method continues to step 420.

At step 420, master server 120 begins to generate online replication journal entries comprising sets of instructions indicating write events at one or more data ranges, and the data that is to be written to the data ranges. In some embodiments, master server 120 will capture the point in time at which the determination is made to switch to an online replication process, and this point in time will act as the watershed for generating online replication journal entries for the online replication process, as opposed to the low content journal entries used in the periodic replication process. In particular embodiments, master server 120 may then begin to take VSS snapshots of those write events occurring after the watershed point in time, and may place the snapshots into the generated online replication journal entries. In further embodiments, the online replication journal entries are then queued behind the previously generated low content journal entries in spool 231.

Once master server 120 has begun to generate online replication journal entries, the method continues to step 430. At step 430, master server 120 retrieves the data to be written to the data ranges indicated in the one or more low content replication journal entries. This may be accomplished, for example, by taking VSS snapshots of the data ranges indicated in the low content replication journal entries. Referring to FIG. 3B, this includes retrieving data A, D, E, and F from data range 1-4. Master server 120 then generates full content replication journal entries at step 440, comprising the instructions from the low content replication journal entries indicating write events at one or more data ranges and the retrieved data from step 430. At step 450, master server 120 sends one or more of the full content replication journal entries to replica server 130 for replication. At step 460, master server 120 then sends the online replication journal entries to replica server 130 for replication.

Figure 5:
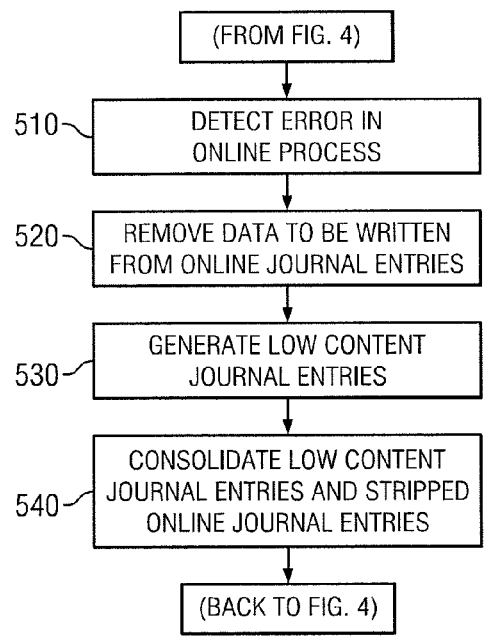
FIG. 5 illustrates an example method for handling errors in the online replication process

FIG. 5 illustrates an example method for handling errors in the online replication process. At step 510, master server 120 detects an error in the online replication process. This may include, for example, spool 231 overfilling before all full content replication journal entries are sent to replica server 130 for replication. At step 520, master server 120 removes the data portions from the online replication journal entries, leaving only the instructions indicating write events at particular data ranges. For example, referring to FIG. 3B, the online replication journal entry may be the result of two previous write events at t=1 and t=2, containing both instructions indicating a write event at data range 1-4 and the data written to data range 1-4, i.e. A, B, C, and D. If an error is detected at step 520, then the data A, B, C, and D would be deleted from the online replication journal, leaving only the instructions indicating a write event at data range 1-4. Thus, the online replication journal entries resemble low content replication journal entries.

Once the data is removed from the online replication journal entries at step 520, master server 120 then switches to a periodic replication process and begins to generate low content replication journal entries at step 530. In particular embodiments, the low content replication journal entries generated may record those write events occurring after the error detection. At step 540, master server 120 consolidates the stripped online replication journal entries and the low content replication journal entries according to the consolidation method above. After consolidation, master server 120 may then check to determine whether it may switch back to the online replication process, as shown in FIG. 4.

Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

What is claimed:

1. A method for synchronizing and replicating data sets, comprising:
   receiving a request to synchronize a first data set associated with a first server and a second data set associated with a second server;
   determining, with reference to one or more replication constraints, whether to begin synchronization, using a processor;
   applying one or more resource control actions in response to determining to begin synchronization, wherein applying one or more resource control actions comprises generating one or more first low content replication journal entries comprising a set of instructions indicating write events at one or more data ranges;
   retrieving data from the one or more data ranges;
   generating one or more full content replication journal entries comprising the one or more first low content replication journal entries and the retrieved data;
   determining whether to begin generating one or more online replication journal entries based on the amount of instructions in the one or more first low content replication journal entries, availability of a network, and the one or more replication constraints; and
   generating the one or more online replication journal entries in response to a change in the first data set.

2. The method of claim 1, wherein the one or more replication constraints are based on a system utilization metric of the first server.

3. The method of claim 1, wherein the one or more replication constraints are based on the time of day.

4. The method of claim 1, wherein applying one or more resource control actions comprises:
   determining compliance with the one or more replication constraints; and
   determining a synchronization speed based in response to non-compliance with the one or more replication constraints.

5. The method of claim 4, wherein determining compliance with one or more replication constraints comprises:
   determining a system utilization metric of the first server; and
   comparing the system utilization metric of the first server to the one or more replication constraints.

6. The method of claim 1, further comprising:
   receiving a first set of instructions indicating write events at one or more data ranges from the first content journal entries;
   receiving a second set of instructions indicating write events at one or more data ranges from the first low content journal entries;
   identifying one or more redundancies between the first and second sets of instructions; and
   generating a third set of instructions comprising the instructions of the first and second sets of instructions without the one or more redundancies.

7. The method of claim 1, wherein it is determined to begin generating the one or more online replication journal entries, the method further comprising:
   sending the one or more full content replication journal entries to the second server for replication, wherein the one or more online replication journal entries comprise a set of instructions indicating write events at one or more data ranges and the data to be written to the one or more data ranges; and
   sending one or more of the one or more online replication journal entries to the second server for replication.

8. The method of claim 7, further comprising:
   detecting an error at the first server;
   removing the data to be written to the one or more data ranges from the one or more online replication journal entries;
   generating one or more second low content replication journal entries comprising a set of instructions indicating write events at one or more data ranges; and
   consolidating the one or more online replication journal entries and the second set of one or more second low content replication journal entries.

9. The method of claim 8, wherein consolidating the one or more online replication journal entries and the one or more second low content replication journal entries comprises:
   receiving a first set of instructions indicating write events at one or more data ranges from the second low content journal entries;
   receiving a second set of instructions indicating write events at one or more data ranges from the second low content journal entries;
   identifying one or more redundancies between the first and second sets of instructions; and
   generating a third set of instructions comprising the instructions of the first and second sets of instructions without the one or more redundancies.

10. The method of claim 1, further comprising:
    sending one or more of the one or more full content replication journal entries to the second server for replication; and
    recording which of the one or more full content replication journal entries have been sent to the second server for replication.

11. A system for synchronizing and replicating data sets, comprising:
    an interface operable to receive a request to synchronize a first data set associated with a first server and a second data set associated with a second server; and
    one or more processors operable to:
      determine, with reference to one or more replication constraints, whether to begin synchronization; and
      apply one or more resource control actions in response to determining to begin synchronization, wherein applying one or more resource control actions comprises generating one or more first low content replication journal entries comprising a set of instructions indicating write events at one or more data ranges;
      retrieve data from the one or more data ranges;
      generate one or more full content replication journal entries comprising the one or more first low content replication journal entries and the retrieved data;

determine whether to begin generating one or more online replication journal entries based on the amount of instructions in the one or more first low content replication journal entries, availability of a network, and the one or more replication constraints; and generate the one or more online replication journal entries in response to a change in the first data set.

12. The system of claim 11, wherein the one or more processors operable to apply one or more resource control actions are further operable to:

determine compliance with one or more replication constraints, wherein at least one of the replication constraints is based on a system utilization metric or the time of day;

determine a synchronization speed based in response to non-compliance with the one or more replication constraints; and generate one or more low content replication journal entries comprising a set of instructions indicating write events at one or more data ranges.

13. The system of claim 12, wherein the one or more processors are further operable to:

receive a first set of instructions indicating write events at one or more data ranges from the low content journal entries;

receive a second set of instructions indicating write events at one or more data ranges from the low content journal entries;

identify one or more redundancies between the first and second sets of instructions; and generate a third set of instructions comprising the instructions of the first and second sets of instructions without the one or more redundancies.

14. Logic encoded in a non-transitory computer readable medium, the logic being operable, when executed by a processor, to:

receive a request to synchronize a first data set associated with a first server and a second data set associated with a second server;

determine, with reference to one or more replication constraints, whether to begin synchronization;

apply one or more resource control actions in response to determining to begin synchronization, wherein applying one or more resource control actions comprises generating one or more first low content replication journal entries comprising a set of instructions indicating write events at one or more data ranges;

retrieve data from the one or more data ranges;

generate one or more full content replication journal entries comprising the one or more first low content replication journal entries and the retrieved data;

determine whether to begin generating one or more online replication journal entries based on the amount of instructions in the one or more first low content replication journal entries, availability of a network, and the one or more replication constraints; and generate the one or more online replication journal entries in response to a change in the first data set.

15. The logic of claim 14, wherein the logic operable to apply one or more resource control actions is further operable to:

determine compliance with one or more replication constraints, wherein at least one of the replication constraints is based on a system utilization metric or the time of day;

determine a synchronization speed based in response to non-compliance with the one or more replication constraints;

generate one or more low content replication journal entries comprising a set of instructions indicating write events at one or more data ranges;

retrieve data from the one or more data ranges; and generate one or more full content replication journal entries comprising the one or more low content replication journal entries and the retrieved data.

16. The logic of claim 15, the logic being further operable to:

receive a first set of instructions indicating write events at one or more data ranges from the low content journal entries;

receive a second set of instructions indicating write events at one or more data ranges from the low content journal entries;

identify one or more redundancies between the first and second sets of instructions; and generate a third set of instructions comprising the instructions of the first and second sets of instructions without the one or more redundancies.

17. A system for synchronizing and replicating data sets, comprising:

means for receiving a request to synchronize a first data set associated with a first server and a second data set associated with a second server;

means for determining, with reference to one or more replication constraints, whether to begin synchronization;

means for applying one or more resource control actions in response to determining to begin synchronization, wherein applying one or more resource control actions comprises generating one or more first low content replication journal entries comprising a set of instructions indicating write events at one or more data ranges;

means for retrieving data from the one or more data ranges;

means for generating one or more full content replication journal entries comprising the one or more first low content replication journal entries and the retrieved data;

means for determining whether to begin generating one or more online replication journal entries based on the amount of instructions in the one or more first low content replication journal entries, availability of a network, and the one or more replication constraints; and means for generating the one or more online replication journal entries in response to a change in the first data set.

18. The system of claim 17, further comprising:

means for determining compliance with one or more replication constraints, wherein at least one of the replication constraints is based on a system utilization metric or the time of day;

means for determining a synchronization speed based in response to non-compliance with the one or more replication constraints;

means for generating one or more low content replication journal entries comprising a set of instructions indicating write events at one or more data ranges;

means for retrieving data from the one or more data ranges; and means for generating one or more full content replication journal entries comprising the one or more low content replication journal entries and the retrieved data.

19. The system of claim 18, further comprising:
means for receiving a first set of instructions indicating write events at one or more data ranges from the low content journal entries;
means for receiving a second set of instructions indicating write events at one or more data ranges from the low content journal entries;
means for identifying one or more redundancies between the first and second sets of instructions; and
means for generating a third set of instructions comprising the instructions of the first and second sets of instructions without the one or more redundancies.

* * * * *